(12) United States Patent
Somani et al.

(10) Patent No.: US 9,685,852 B2
(45) Date of Patent: Jun. 20, 2017

(54) POWER CONVERTER SYSTEM HAVING ACTIVE STANDBY MODE AND METHOD OF CONTROLLING THE SAME

(71) Applicant: DYNAPOWER COMPANY LLC, South Burlington, VT (US)

(72) Inventors: Apurva Somani, South Burlington, VT (US); John C. Palombini, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 15/197,007

(22) Filed: Jun. 29, 2016

(65) Prior Publication Data

US 2017/0005564 A1    Jan. 5, 2017

Related U.S. Application Data

(60) Provisional application No. 62/188,282, filed on Jul. 2, 2015.

(51) Int. Cl.
*H02J 3/08* (2006.01)
*H02M 1/088* (2006.01)
(Continued)

(52) U.S. Cl.
CPC ............ *H02M 1/088* (2013.01); *H02J 3/08* (2013.01); *H02J 3/32* (2013.01); *H02J 3/38* (2013.01);
(Continued)

(58) Field of Classification Search
CPC .............................................. H02J 3/38–3/50
See application file for complete search history.

(56) References Cited

U.S. PATENT DOCUMENTS 8,817,510 B2 *  8/2014  Esram ................... H02J 3/383
                                                363/132
2011/0232714 A1 *  9/2011  Bhavaraju ............... H02J 3/385
                                                136/244

(Continued)

OTHER PUBLICATIONS

International Search Report and Written Opinion both dated Oct. 27, 2016; PCT/US2016/040004.

*Primary Examiner* — Rexford Barnie
*Assistant Examiner* — David Shiao
(74) *Attorney, Agent, or Firm* — Ladas & Parry LLP

(57) ABSTRACT

A power system having a plurality of operating modes including an active mode and an active standby mode includes a power converter and a controller the power converter is configured to adapt a power supply to a desired output, and the power converter includes a plurality of semiconductor switches that receive a gating signal when the power system is in the active mode such that the power converter is in a gating state. The controller controls the power converter in the active mode and the active standby mode, and the controller is configured to: while the power converter is synchronized to the grid, determine whether the power system should enter into the active standby mode in which the power converter is in a non-gating state; when it is determined the power system should enter into the active standby mode, control the power converter to be in a non-gating state such that the power system is in the active standby mode.

29 Claims, 6 Drawing Sheets

(51) Int. Cl.
*H02M 3/00* (2006.01)
*H02M 7/00* (2006.01)
*H02J 3/32* (2006.01)
*H02J 3/38* (2006.01)
*H02J 3/40* (2006.01)
*H02J 9/00* (2006.01)
*H02M 7/539* (2006.01)
*H02M 1/00* (2006.01)

(52) U.S. Cl.
CPC ............... *H02J 3/381* (2013.01); *H02J 3/40* (2013.01); *H02J 9/005* (2013.01); *H02M 3/00* (2013.01); *H02M 7/00* (2013.01); *H02M 7/539* (2013.01); *H02J 2003/388* (2013.01); *H02M 2001/0032* (2013.01)

(56) References Cited

U.S. PATENT DOCUMENTS

| | | | |
|---|---|---|---|
| 2011/0273022 A1 | 11/2011 | Dennis et al. | |
| 2012/0176088 A1* | 7/2012 | Lee | H02J 3/383 320/128 |
| 2013/0107594 A1* | 5/2013 | Wagoner | H02J 3/383 363/97 |
| 2013/0181530 A1 | 7/2013 | Deboy et al. | |
| 2013/0193933 A1* | 8/2013 | Andresen | H02P 9/02 322/23 |
| 2013/0242616 A1* | 9/2013 | Oldenkamp | H02J 3/383 363/16 |
| 2013/0300196 A1 | 11/2013 | Clark et al. | |
| 2014/0001759 A1* | 1/2014 | Gupta | F03D 9/003 290/44 |
| 2014/0239724 A1* | 8/2014 | Ishikawa | H02J 5/00 307/66 |
| 2014/0301120 A1* | 10/2014 | Zhu | H02H 7/06 363/49 |
| 2014/0368042 A1 | 12/2014 | Giuntini et al. | |
| 2015/0188401 A1* | 7/2015 | Zheng | H02M 1/00 363/95 |
| 2015/0311696 A1* | 10/2015 | Zhu | H02H 7/06 361/21 |
| 2016/0072281 A1* | 3/2016 | Izumi | G05B 15/02 700/296 |

* cited by examiner

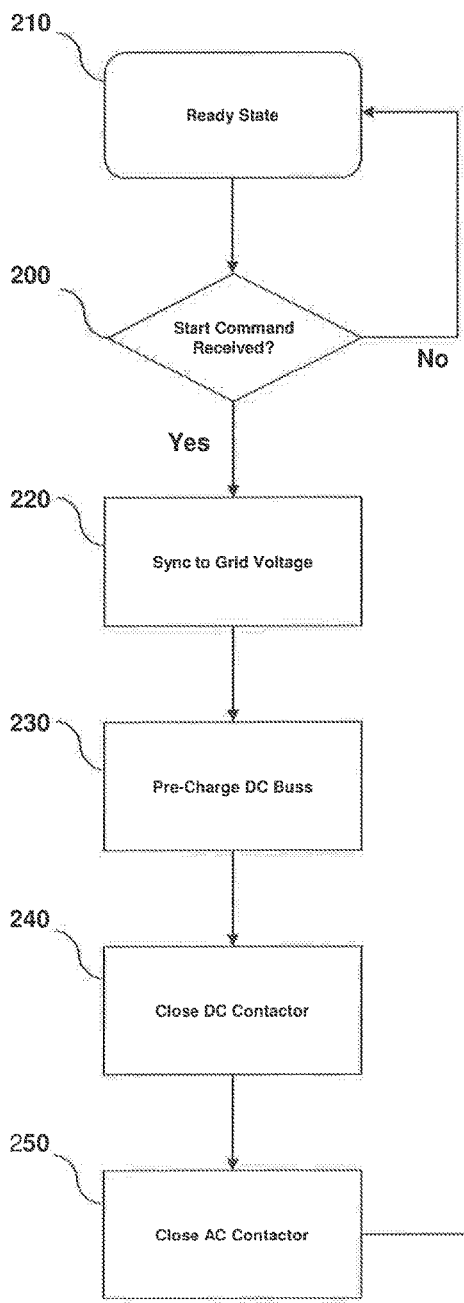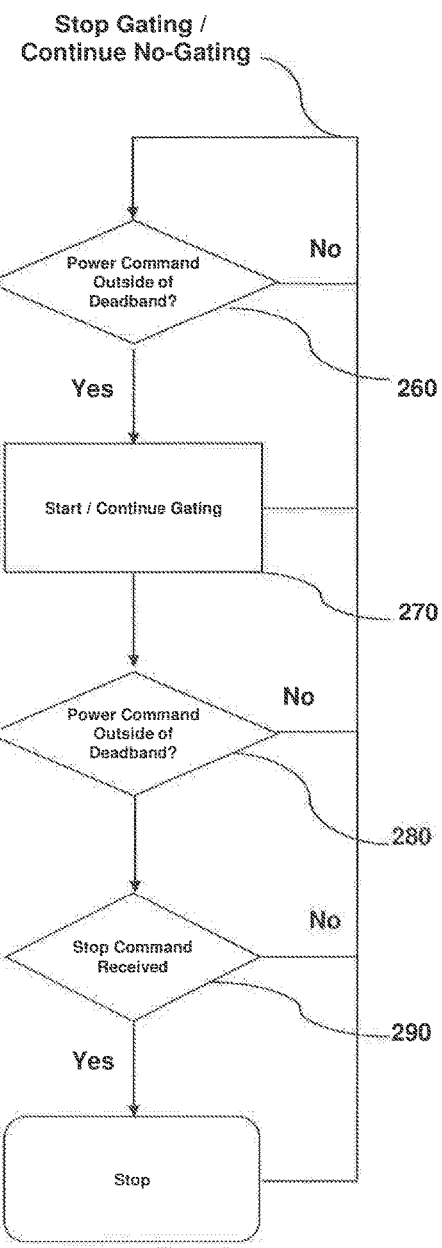

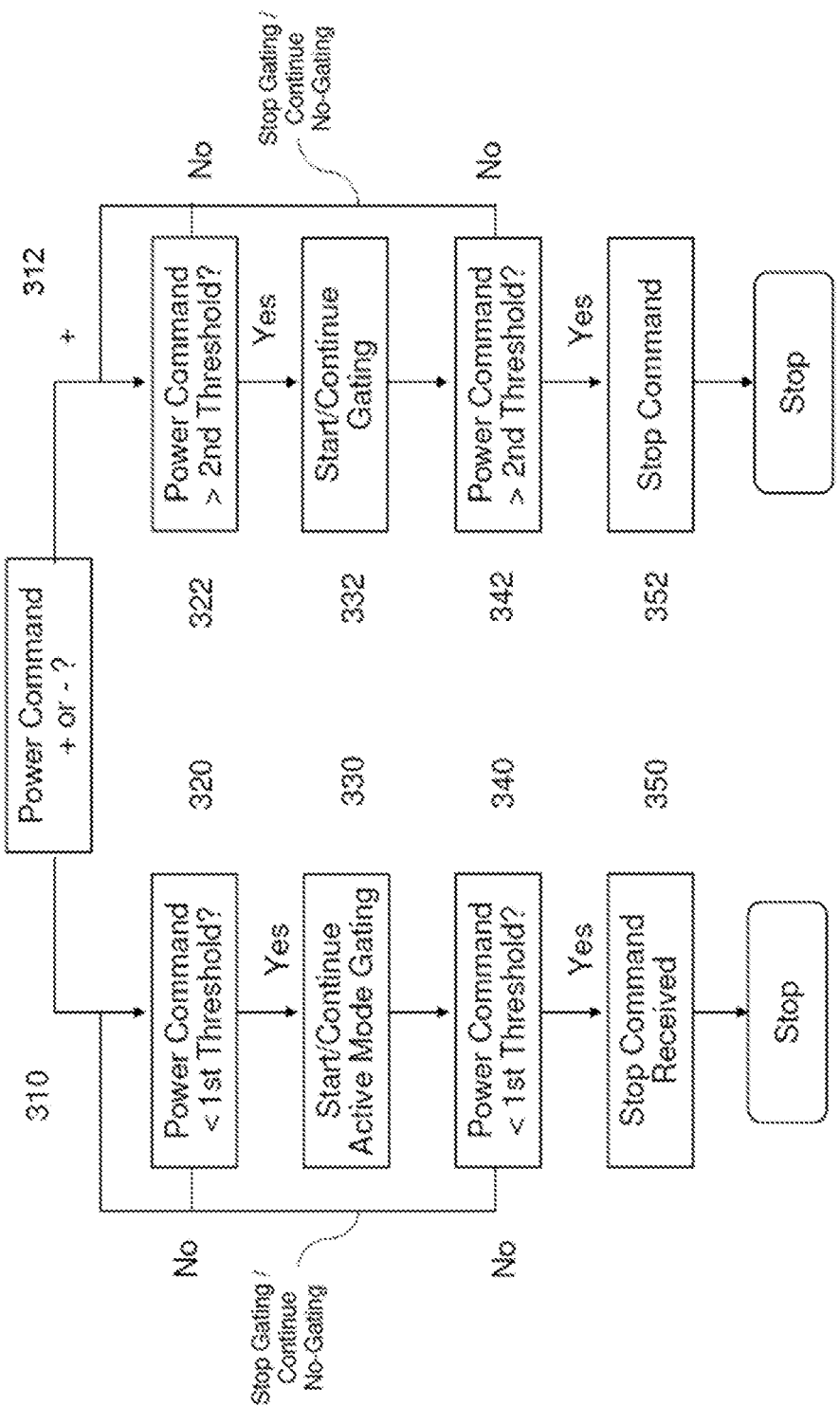

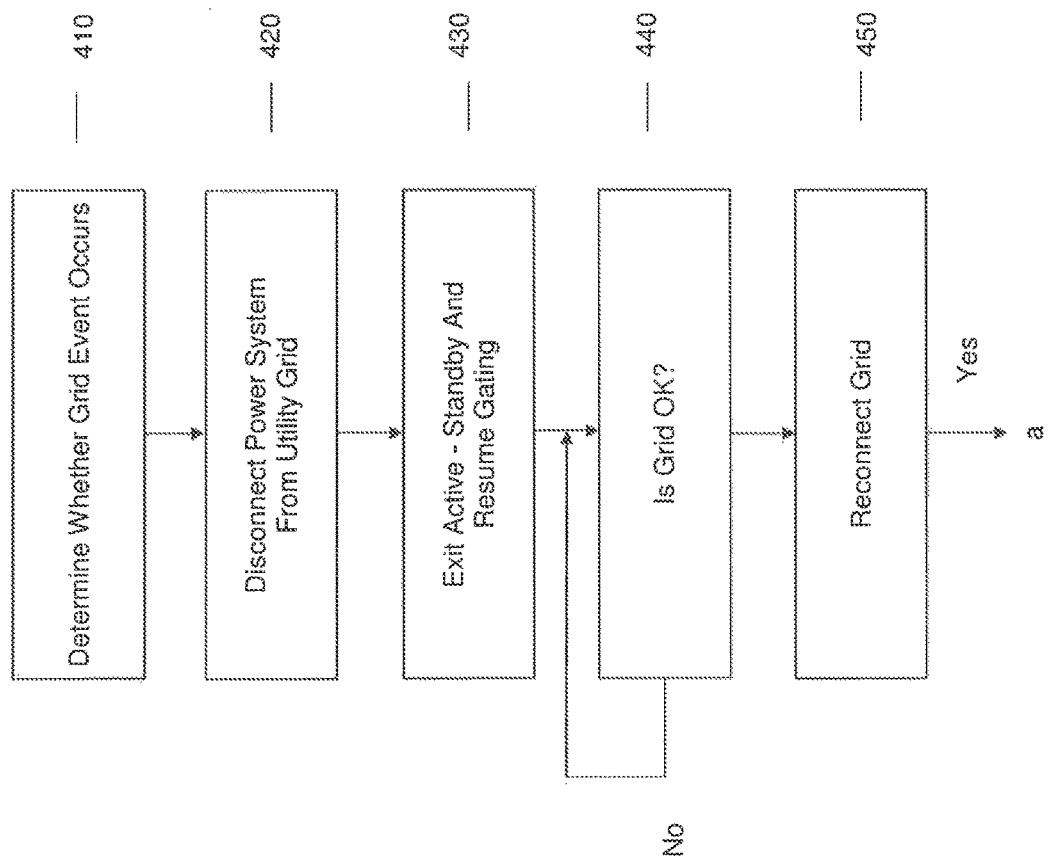

POWER CONVERTER SYSTEM HAVING ACTIVE STANDBY MODE AND METHOD OF CONTROLLING THE SAME

RELATED APPLICATIONS

The present patent document claims the benefit of the filing date under 35 U.S.C. §119(e) of Provisional U.S. Patent Application Ser. No. 62/188,282, filed Jul. 2, 2015, which is hereby incorporated by reference.

DESCRIPTION

Field of the Invention

The present invention relates generally to an electric power converter for power conversion between a power source and a grid; and more specifically, to an electric power converter having a plurality of operating modes including an active standby mode, and a method of controlling the same.

BACKGROUND

A power system may include distributed power sources (e.g., distributed generators, battery banks, and/or renewable resources like solar panels or wind turbines to provide power supply to a grid (e.g., a microgrid having local loads and/or a utility grid). The power system may include a power converter, such as a power inverter, for converting power between a power source and a grid. Such power conversion may include AC/DC, DC/DC, AC/AC and DC/AC.

A micro-grid system can include a variety of interconnected distributed energy resources (e.g., power generators and energy storage units) and loads. The micro-grid system may be coupled to the main utility grid through switches such as circuit breakers and/or contactors. In the event that micro-grid system is connected to the main utility grid, the main utility grid may supply power to the local loads of the micro-grid system. The main utility grid itself may power the local loads, or the main utility grid may be used in combination with the power sources of the micro-grid to power the local loads.

A controller comprising hardware and software systems may be employed to control and manage the micro-grid system. Furthermore, the controller is able to control the on and off state of the switches so that the micro grid system can be connected to or disconnected from the main grid accordingly. The grid connected operation of the micro-grid system is commonly referred to as "grid tied" mode, whereas the grid disconnected operation is commonly referred to as "islanded" or "stand alone" mode. A micro-grid system in grid tied mode should be capable of disconnected from the main grid and transitioning to islanded mode in the case of a grid event in which abnormal operation conditions, such as a power outage, occur at the main utility grid.

When the micro-grid includes a battery bank, a battery energy storage system may be used to provide power to, or to receive power from, the micro-grid. The battery energy storage system can be used as an energy storage unit in a smart grid system. Renewable energy sources such as photovoltaic/solar panels and wind turbines are intermittent sources subject to unpredictable and inconvenient weather patterns. The generation source rarely matches the load needs; and therefore, it is desirable to provide energy storage units. The use of energy storage units, which can both store and supply power, allows the micro-grid system to provide reliable and stable power to local loads.

The energy storage units can also store excess energy from the renewable sources (and potentially the grid). For example, renewable energy generation may exceed load demand of the micro-grid. Without energy storage capability, the extra generation is lost. If energy storage units are employed in the micro-grid, the extra generation can be captured by storing it in the batteries. The energy storage units can then supply this power to local loads and even the main utility grid where appropriate.

In a power system such as the battery energy storage system described above, the power source or storage unit is not constantly providing power. For example, in the case of a battery bank providing grid stability services such as automatic voltage response, the batteries may be neither discharging nor charging. Power systems, such as the battery energy storage system discussed above, have an "off" and an "on" state. During the "off" state, the switches are open and the inverter is not synchronized to the grid. Thus, the "off" state can be used to conserve power when the battery bank is neither charging nor discharging. However, the switches are mechanical or electromechanical switches such as contactors. Thus, when the system needs to operate (e.g., power needs to be supplied to or from the battery), the startup time is limited by the closing time of these mechanical switches, which may be up to several hundred milliseconds or several utility voltage cycles. A delay of this magnitude is undesirable to a user of the power system.

BRIEF SUMMARY OF THE INVENTION

Embodiments of the present invention include an electric power converter, system and control method having a plurality of operating modes including an active standby mode for improving the response time and energy savings of an inverter system.

In one aspect, a power system having a plurality of operating modes including at least an active mode and an active standby mode includes a power converter and a controller. The power converter is configured to adapt a power supply to a desired output, and the power converter includes a plurality of semiconductor switches that receive a gating signal when the power system is in the active mode such that the power converter is in a gating state. The controller controls the power converter in the active mode and the active standby mode, and the controller is configured to: while the power converter is synchronized to the grid, determine whether the power system should enter into the active standby mode in which the power converter is in a non-gating state; when it is determined the power system should enter into the active standby mode, control the power converter to be in a non-gating state such that the power system is in the active standby mode.

The power converter may be coupled between the power source and a power inverter, and the controller may determine whether the power system should enter into the active standby mode while the power inverter is synchronized to a grid.

The power converter may be a power inverter coupled between the power source and a grid, and the controller may determine whether the power system should enter into the active standby mode while the power inverter is synchronized to the grid.

The power system may also comprise a power source side switch coupled between the at least one power source and the power converter and a grid side switch coupled between the at least one power source and a grid, with the power source side switch and the grid side switch being closed in both the active mode and the active standby mode.

The power system may also have a power inverter coupled between the power source and the grid, and the controller may be configured to initialize the power inverter. In initializing the power convert, the control controller may be configured to: charge a DC bus from at least one power source; close the power side switch; synchronize the power converter to the grid; enter the power converter into the gating state; close the grid side switch between the power converter and grid, thereby entering the power system into a grid tied mode; and initialize the active standby mode to the off mode.

The at least one power source may be an energy storage unit, and the power system may operate in a discharge state, a charge state, and an idle state. Within the discharge and charge states, the controller controls the power converter to discharge and charge the energy storage unit. The controller may then determine that the power system should enter into the active standby mode when the power system is in an idle state.

The controller may determine whether the power system should enter in to the active standby mode by comparing the power command to a predetermined threshold, and making the determination based on the comparison.

The predetermined threshold may include upper and lower threshold values. In this case, the controller may compare the power command to the lower threshold value when determining whether to enter into active standby mode, and compare the power command to the upper threshold value when determined whether to enter into active mode.

The controller may determine whether the power system should exit the active standby mode and enter the active mode by continuing to compare the power command to the predetermined threshold, and if the power command exceeds the predetermined threshold, control the power converter to be in the gating state.

The controller may be configured to determine whether the power system should enter into the active standby mode by determining whether the power system is in a charge or discharge state (e.g., whether a power command is positive or negative). When the power system is determined to be in a charge state, the controller may compare the power command to a first predetermined threshold, and when it's determined that the power command is higher than the predetermined threshold, the controller may determine that the power system is in an idle state and should enter into active standby mode. When the power system is determined to be in the discharge state, the controller may compare the power command to a second predetermined threshold. When it's determined that the power command is lower than the second predetermined threshold, the controller may determine that the power system is in an idle state and should enter into active standby mode.

The first predetermined threshold may include an upper first threshold value and a lower first threshold value; and the second predetermined threshold may include an upper second threshold value and a lower second threshold value. When it is determined that the power system is in the charge state, the power command is compared to the lower first threshold value to determine whether to enter the active standby mode, and the power command is compared to the upper first threshold value to determine whether to enter the active mode. When the power system is determined to be in the discharge state, the power command is compared to the lower second threshold value to determine whether to enter into the active standby mode, and the power command is compared to the upper second threshold value to determine whether to enter into the active mode.

The power system may also comprise one or more sensors coupled between the power converter and the grid to measure real and reactive power, where the power command is determined based on the real and reactive power measured by the one or more sensors.

The power system may also comprise a controller that is further configured to receive a user command from a master controller to enter into standby mode and determine that the power system should enter into active standby mode when the user command is received.

The controller may be configured to perform an AND operation on the gate signal and the result of the determination as to whether the power system should enter into the active standby mode.

The power converter may be coupled between at least one power source and a utility grid, and the power converter may be electrically coupled to a microgrid have one or more local loads. The power controller may be further configured to: determine when a grid event occurs in the utility grid; open an islanding switch to disconnect the power converter from the utility grid when it is determined that the grid event occurs; and enter into the active mode such that the power converter is gating the supply power to one or more local loads if the power system is in active standby mode when the grid event occurs.

The controller may be configured to: determine whether the system should enter the active standby mode; compare a grid frequency to a predetermined threshold; and determine whether the power system should enter active standby mode according to the comparison.

In another aspect, a method of controlling a power system in a plurality of operating modes, including at least an active mode in which a power converter is synchronized to a grid and is in a gating state and an active standby mode in which the power inverter is synchronized to the grid and not in a gating state, includes: comparing a power command to a predetermined threshold, and determining whether the system should enter into the active standby mode based on the comparison; and when it's determined that the system should enter into the active standby mode, controlling the power converter to be in a non-gating state.

Prior to comparing the power command to the predetermined threshold, the method may further comprise initializing the power converter, the initializing comprising: synchronizing the power converter to the grid; entering the power converter into the gating state; closing a switch coupled between the power converter and grid such that the power system is in grid-tied mode; and initializing active standby mode to off.

The method that may further comprise: after determining the power system should enter into active standby mode, continuing to compare the power command to the predetermined threshold in order to determine whether the power system should exit the active standby mode and enter the active mode Comparing a power command to a predetermined threshold and determining whether the power system should enter into active standby mode based on the comparison may comprise: determining the charge or discharge state of the power system and determining the positivity or negativity of the power command; when it's determined that the power system is in the charge state, comparing the power command to the first predetermined threshold, and when it's determined that the command is higher than the threshold, determining that the system should enter active standby mode; when it's determined that the system is in the discharge state, comparing the power command to a second predetermined threshold, and when it's determined that the command is lower than the second threshold, determining that the system should enter active mode.

The method may further comprise receiving the power command from a separate master controller.

The method may further comprise: determining when a grid event occurs; when said grid event occurs, opening an islanding switch to disconnect the power inverter from the grid; and if the system is in active standby mode when the grid event occurs, entering into the active standby such that the power inverter is gating to supply power to a local load.

In another aspect, a power inverter system operating in a plurality of modes including at least an active and an active standby mode comprises a power inverter and a controller. The power inverter converts power between a power source and a grid, and the power inverter may comprise a plurality of semiconductor switches receiving a gate signal when operating in the active mode such that the power inverter in is a gating state. The controller controls the power inverter in the active and active standby modes, and the controller may be configured to: synchronize the power inverter to the grid; control the power inverter to be in the gating state in the active mode so that the semiconductor switches receive the gate signal; determine whether the power inverter should enter into active standby mode in which the inverter is in a non-gating state; and when in active standby mode, control the power inverter to be in a non-gating state.

The plurality of semiconductor switches may comprise at least one of insulated gate bipolar transistors, silicon carbide devices and MOSFETs.

The controller may be configured to determine whether the power inverter should enter the active standby mode by comparing a power command to a predetermined threshold, and determining whether the inverter should enter the active standby mode according to the comparison.

While the power inverter is in the active standby mode, the controller may compare the power command to the predetermined threshold to determine whether the inverter should exit the active standby mode and enter active mode.

The controller being configured to determine whether the power inverter should enter into the active standby mode may include the controller being configured to: determine whether a power command is positive or negative; when the command is negative, compare the command to a first predetermined threshold, and when the command is higher than the threshold, determine that the inverter should enter into active standby mode; when the power command is positive, compare the command to a second predetermined threshold, and when the command is lower than the second threshold, determine that the inverter should enter into active standby mode.

The controller may be configured to receive a user command from a master controller to enter standby mode, and determine that the power inverter should enter the active standby mode when the command is received.

A power inverter system in which the controller may also be configured to perform an AND operation on the gate signal and determine whether the inverter should enter the active standby based on the result of the determination.

The controller may be further configured to; determine when a grid event occurs; if the inverter is in active standby mode when it determined that said grid event occurs, enter into the active mode such that the inverter is gating to supply power to a local load.

The controller may be configured to compare a grid frequency to a predetermined threshold, and determine whether the system should enter into the active standby mode according to the comparison.

BRIEF DESCRIPTION OF THE FIGURES
(NON-LIMITING EMBODIMENTS OF THE DISCLOSURE)

Other advantages of the present invention will be readily appreciated, as the same becomes better understood by reference to the following detailed description when considered in connection with the accompanying drawings, wherein:

FIGS. 2A and 2B illustrate a method of controlling the power system according to an embodiment of the present invention in which the power system implements a plurality of operating modes while the power converter is synchronized to the grid. FIG. 2A is a method for initializing the power converter 200, during which the power converter is synchronized to the grid. FIG. 2B is a method of implementing the plurality of operating modes.

FIG. 3 illustrates a method of controlling the power system according to an embodiment of the present invention in which the power system is connected to an energy storage unit and implements a plurality of operating modes.

FIG. 4 illustrates a method of controlling the power system according to an embodiment of the present invention in which the power system operates in grid-tied mode and islanded mode.

DETAILED DESCRIPTION

Reference will now be made to detailed embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, and components have not been described in detail so as not to unnecessarily obscure aspects of the embodiments.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Figure 1A:
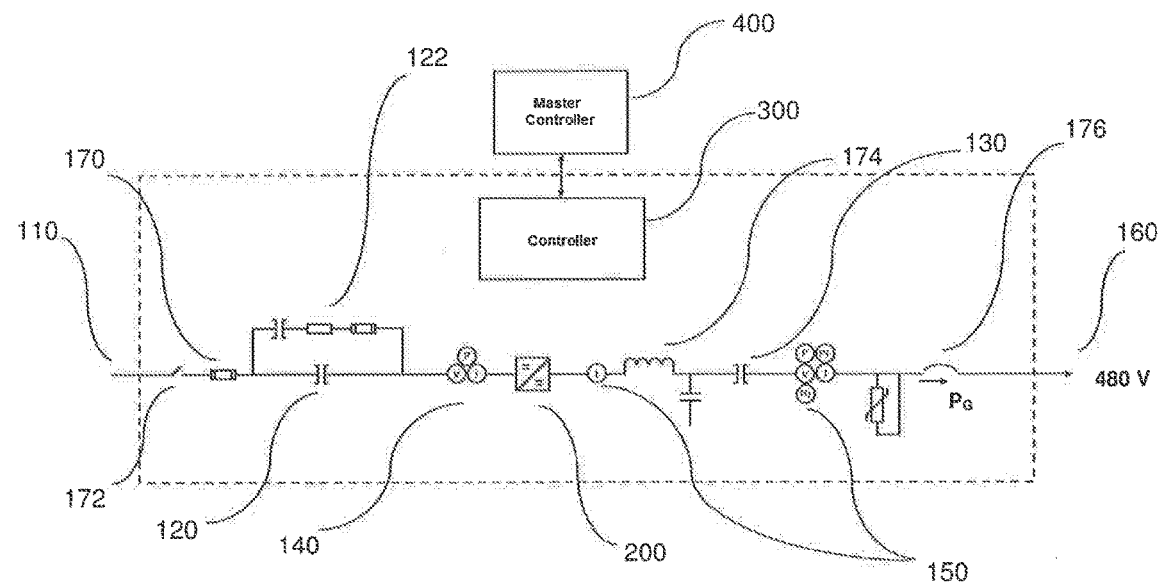
FIG. 1A is an electrical schematic diagram illustrating a power system according to an embodiment of the present invention.
Figure 1B:
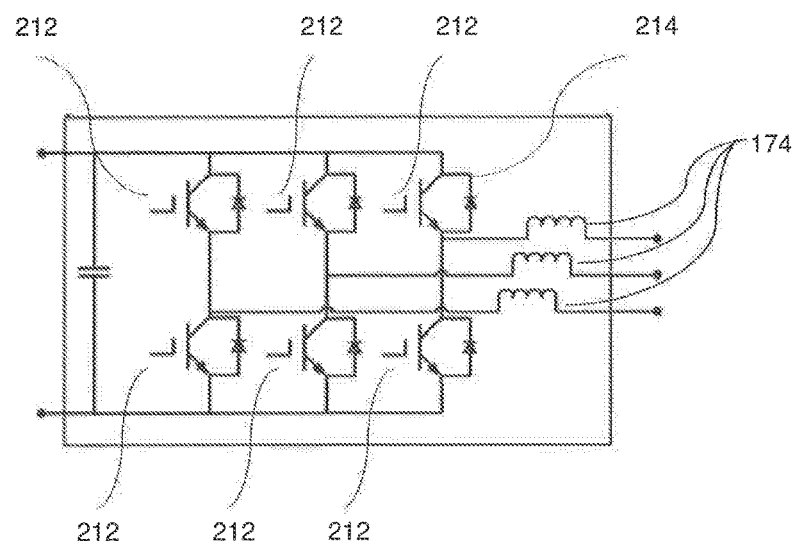
FIG. 1B is an electrical schematic diagram illustrating the circuitry of the power converter and the inductor of the filter shown in FIG. 1A.

FIG. 1A is an electrical schematic diagram illustrating a power system 100 according to an embodiment of the present invention. FIG. 1B is an electrical schematic diagram illustrating the circuitry of the power converter 200 and the inductor of filter 174 shown in FIG. 1A.

Referring to FIG. 1A, a power system 100 according to an embodiment of the present invention may include a power converter 200, an input 110, switches 120 and 130, sensors 140 and 150 and a controller 300. Input 110 is coupled to a power source (e.g., a power generator or energy storage unit) that supplies power to the power system 100. The input 110 is electrically coupled to the power source side switch 120. The power converter 200 converts power between the power source coupled to input 110 and a grid that is coupled to the power system 100 at grid connection 160. On the grid side, power converter 200 is coupled to grid side switch 130, and the grid side switch 130 is coupled to a grid at the grid connection. Power conversion by power converter 200 may include AC/DC, DC/DC, AC/AC and DC/AC.

In an embodiment, the power converter 200 may be a bi-directional power inverter that converts power between DC and AC. The inverter 200 may convert power between DC and AC and may be controlled in different schemes. For example, in a grid-tied scheme, the power inverter is connecting to an established grid (e.g., a utility grid) and is operating in current source mode. In a grid forming scheme, the inverter is setting or creating the grid and is operating in voltage source mode.

Figure 5A:
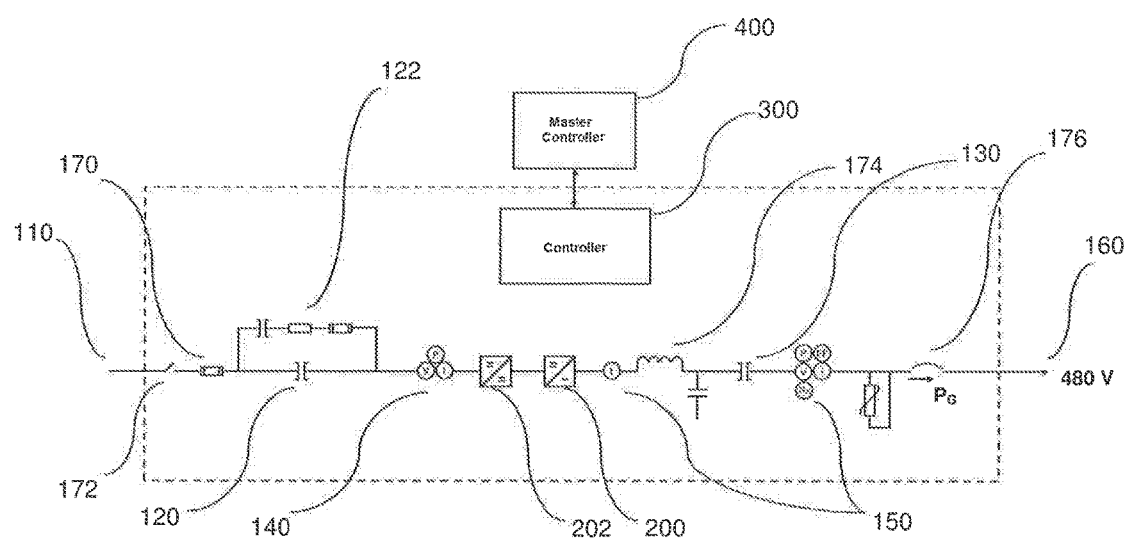
FIG. 5A is an electrical schematic diagram illustrating a power system according to an embodiment of the present invention.
Figure 5B:
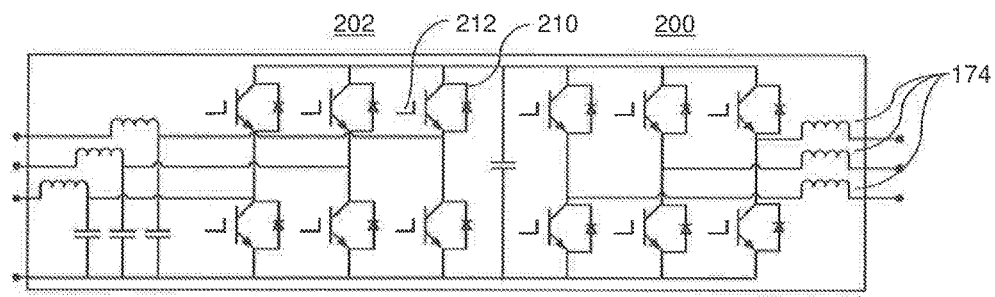
FIG. 5B is an electrical schematic diagram illustrating the circuitry of the power converter shown in FIG. 1A.

In another embodiment, the power converter may be a power converter 202 that is coupled between the power source 110 and another power converter 200, such as a power inverter 200. Such an example is shown in FIGS. 5A and 5B. In this example, power inverter 200 is coupled between the input 110 and the grid connection 160, and power converter 202 is coupled between the power inverter 200 and the input 110. In the example shown in FIGS. 5A and 5B, the power converter 202 may be a DC/DC power converter that provides a voltage source to the power inverter 200. The flow of energy through the DC/DC power converter 202 is modulated to maintain an appropriate voltage source to the inverter 200. In another embodiment, the power converter 202 may be an AC-DC converter 204 coupled to an AC source (e.g., a wind turbine) at input 110. The AC-DC converter 202 may then be coupled to a DC-AC inverter 200. In this embodiment, the flow of energy through the AC-DC converter 202 is modulated to maintain an appropriate voltage source to the inverter 200, and the inverter 200 converts the power to AC suitable for grid connection 160.

The power system 100 may also include additional elements such as fuse 170, manual disconnect switch 172, pre-charge circuit 122, LC filter 174, and grid circuit breaker 176. Fuse 170 is for disconnecting input 110 from the power converter 200 in the event of a fault. The manual disconnect switch 172 can be opened manually so that equipment in the power system 100 can be serviced. Pre-charge circuit 122 may be used to pre-charge the DC bus. LC or resonant filter 174 may be configured to filter the AC output of power converter 200. The AC output of power converter 200 may usually contain harmonics and/or noises of other frequencies. Output LC filter 200 may be configured to filter out these harmonics and/or noises. Circuit breaker 176 can be manually opened so that equipment in power system 100 can be serviced, or circuit breaker 176 may open in an over current event to disconnect from the grid connected to grid connection 160.

The grid connection 160 may be a connection to a micro-grid and/or a main (utility) grid. The micro-grid may include one or more distributed energy resources (distributed generators and energy storage units) and local loads within a local area. When the power system 100 is connected to the micro-grid through grid connection 160, the power source connected to input 110 is one of the distributed energy resources (i.e. a generator or an energy storage unit) of the micro-grid. The loads can be one user (e.g., a utility customer), a grouping of several sites, or dispersed sites that operate in a coordinated fashion. The distributed generators may include reciprocating engine generators, micro-turbines, fuel cells, photovoltaic/solar panels, wind turbines, etc. The distributed energy resources of the micro-grid may be coordinated by a master (or user) controller 400. The master controller 400 may be physically separate from the controller 300 of the power system 100, may be included within the same box, or could be integrated with or included as part of the controller 300. The local loads of the micro-grid may be powered by the distributed energy resources of the micro-grid and/or the utility grid to which the micro-grid is connected.

In an embodiment, the power source connected to the input 110 may be an energy storage unit such as a battery (which could be a battery bank that includes plural batteries) that both stores and supplies energy from/to the grid. In this case, the input 110 is a DC input and the power converter 200 may be a 3-phase bi-directional power inverter that converts DC electric power on the DC side to AC electric power on the grid side and vice versa.

When the power system 100 is connected to a micro-grid, the battery connected to input 110 may store excess energy not needed to power the local loads from one or more other distributed energy sources of the micro-grid. The battery may also store energy from the main utility grid. Energy stored in the battery connected to the input 110 may be supplied to local loads in the event of an outage at the main utility grid. The energy stored in the battery may also be used to provide more reliable and stable power when the micro-grid includes more unpredictable energy resources such as photovoltaic/solar panels and wind turbines.

The power source side switch 120 may be an electromechanical switch such as a DC contactor, and the grid side switch 130 may be an electromechanical switch such as an AC contactor. When power system 100 is in an "off" state, the electromechanical switches 120 are opened to disconnect the power converter 200 from the power supply connected to input 110 and the grid connected to grid connection 160. Conversely, when the power system 100 is in an "on" state, the electromechanical switches 120 are closed.

The DC side switch 120 may, for example, be included within the battery container of the battery connected to input 110 or within the power converter 200. Alternatively, the switch 120 may be installed as part of the site external to both the battery and the power converter 200. In addition, the grid side switch 130 may be included within the power converter 200 or may be part of the site external to the power converter 200.

The power converter 200 and the controller 300 together operate as a power conversion system for converting power between the power source and the grid. In an embodiment, the controller 300 is responsible for the control, monitoring, and measurement of the power system 100 and may communicate with a master (or user) controller 400 in the event that the power system 100 is connected to a micro-grid that is coordinated by a master (or user) controller. The switches 120 and 130 may be controlled by the controller 300. The switches 120 and 130 may be electrically operated by the controller 300 through relay logic. The controller 300 uses the sensors 150 between switch 120 and grid connection 160 to monitor the voltage amplitude, frequency and phase of the grid, and the controller 300 uses the sensor 150 between filter 174 and power converter 200 to monitor the AC output current amplitude, frequency and phase of the power converter 200. The controller may also monitor DC input voltage through sensors 140. For sensors 140 and 150, 'V' and 'I' represent a voltage measurement and a current measurement, respectively, 'P' and 'PF' represent power by calculation and power factor by calculation, respectively, and 'Hz' represents a frequency measurement. The sensors 150 may include potential transformers, and the sensors 140 may include an isolated voltage monitor.

The controller 300 may be located within the cabinet of the power converter 200 or may be a controller that is external to the power converter 200. The controller 200 may also include a plurality of controllers that communicate together. When the controller 300 is housed within the power converter 200, the controller 300 may be placed in an environment that is protected from the power electronics of the power converter 200 to mitigate electromagnetic noise interfering with the controller's 300 operation. The power electronics of the power converter 200 may be actively cooled by forced air and/or liquid, and may be controlled by controller 300 using fiber optic gating signals or electrical gating signals.

FIGS. 1B and 5B show embodiments of the power electronics of the power converter 200. FIGS. 1B and 5B also show the inductor of the LC filter 174. In the embodiment of FIG. 1B, the power converter 200 is a bi-directional power inverter; and in the embodiment of FIG. 5B, the power converter 202 is a DC/DC converter, and the power converter 200 is a power inverter. Referring to FIGS. 1B and 4B, the power converters 200, 202 and 204 may include a plurality of semiconductor switches 210. Gates 212 of the semiconductor switches 210 receive gating signals when the power converters 200, 202 and 204 are gating (i.e., in a gating state). The gate signals are made up of a plurality of switching pulses for switching the semiconductor switches 210. The controller 300 controls the switching pattern of the semiconductor switches 210 to synchronize the output of the power converter 200 with the sine wave of the grid. In synchronizing the power converter 200 with the grid, the controller may control the semiconductor switches to match the phase, amplitude and/or frequency of the inverter to that of the grid. The semiconductor switches 210 may, for example, be insulated-gate bipolar transistors (IGBTs). Additional examples of semiconductor switches 210 include wide band-gap semiconductor devices such as silicon carbide and metal-oxide-semiconductor field-effect transistors (MOSFETs).

The power system 100 is not always supplying or receiving power to or from the grid, which is referred to as "an idle state", (i.e. real power set point=0 kW). To conserve power, the power system 100 may be placed in the "off" state in which switches 120 and 130 are opened to disconnect the power system 100 from the power source and the grid. In the "off" state, the power converter 200 is not synchronized with the grid. However, response time of the power system 100 when transitioning from the idle state to a fully charging or discharging state is of great importance to a user. The mechanical closure time of these switches may be up to several hundred millisecond. These closure times serve as limitations on the response time of the power system 100. Further, an inverter connected to a DC power source needs to pre-charge the DC bus prior to closing the mechanical switches. This pre-charging operation can further limit the response time by as much as 2 seconds.

One solution to the limitations imposed by the closure time of switches 120 and 130 is to leave the power system 100 connected to the power source and the grid, so that the switches 120 and 130 remain closed. The power converter 200 is then controlled by controller 300 to a set point of 0 kW, meaning that the power converter 200 is controlled to output no power (i.e., 0 kW and 0 kVAR). In this case, the power system 100 can quickly respond to requests even when in an idle state. Taking the example in which the input 110 is connected to a battery and the grid connection 160 is connected to a micro-grid in which a wind turbine is an energy resource, the power system 100 is able to quickly respond to a command to charge the battery (e.g., a sudden gust of wind) or discharge the battery (e.g., decrease in wind resource).

Although this solution solves the problems associated with the closure time of the switches 120 and 130, the power converter 200 is still gating even when the power converter 200 is controlled to output no power. When gating, the gates 212 are still receiving a gating signal, and thus the semiconductor switches 212 are still switching. Accordingly, the power system 100 is still incurring losses even though power is not being processed, and these losses are supplied by energy from the battery. In addition, the power converter's 200 cooling system may need to be run to remove the losses from the semiconductor switches 212.

FIGS. 2A and 2B illustrate a method of controlling the power system 100 according to an embodiment of the present invention in which the power system 100 implements a plurality of operating modes while the power converter 200 is synchronized to the grid. FIG. 2A is a method for initializing the power converter 200, during which the power converter 200 is synchronized to the grid. FIG. 2B is a method of implementing the plurality of operating modes. FIGS. 2A and 2B illustrate a method of implementing the plurality of operating modes in a bi-direction power inverter that is coupled between a DC power source and an AC grid. However, it should be understood the input and grid connection are not limited to being a DC input and an AC grid connection. For example, input 110 may be a DC or AC input and output may be a DC or AC grid connection. In addition, instead of the grid connection, the power converter may be a power converter 202 that is connected to another power converter 200, such as in the example shown in FIG. 4A.

Referring to FIG. 2A, prior to synchronizing to the grid, the controller 300 may perform an analysis to determine whether the power converter 200 is ready to run (step 500). The analysis may include checking to ensure that there are no faults within the power system 100 and any safety parameters check out. Upon receipt of a start command (step 510), the controller synchronizes the power converter 200 to the grid (step 520). The start command may be a command received from master controller 400, input by a user or autonomously generated by the controller 300. In synchronizing the controller to the grid, the controller 300 controls the switching pattern of the semiconductor switches 210 of the power converter 200 to synchronize the output of the power converter 200 with the sine wave of the grid. When the power converter 200 is coupled to a DC power source at input 110, the controller may then control the power system to pre-charge the DC bus (step 530). In pre-charging the DC bus, the power system 100 gently brings the DC voltage up from the DC power source prior to closing the switch 120 connecting the power converter 200 to the input 110. The controller may then close the DC switch 120 so as to energize the battery with the DC port. Upon closing the AC switch 130 connecting the power converter 200 to the grid connection 160 (step 550), the power converter 200 is ready to enter into active mode during which the power converter 200 is gating and can output an AC voltage.

Referring to FIG. 2B, controller 300 may first determine whether the power converter 200 should be in active mode (power converter 200 is gating) or active standby mode (power converter 200 is not gating) (step 560). Step 560 may be an initial determination made by the controller 300 as to whether the power system 100 should be in the active mode or the active-standby mode. In an alternative embodiment, the controller 200 may initialize the power system 100 in the active mode, in which case step 560 would be a determination as to whether to remain in active mode or enter into active-standby mode.

In determining whether the power converter 200 should be in active mode or active-standby mode, the controller 300 compares a power command to a predetermined deadband (or threshold) to determine whether the power command is within or outside of the deadband. The deadband may be set according to any number of ways, including, for example, being set by the user based on a requirement imposed by a regulating authority or being set as a result of a system impact study, which is a technical analysis of the local grid/power system.

The power command may be a command for the power inverter 200 to supply/absorb power, and the power command is the value that is compared to the deadband to determine whether to enter into the active mode or the active-standby mode. The power command may be a command received by the controller 300 from a master controller 400 or may be a command that is generated autonomously by controller 300 based, for example, on measurements taken from sensors. Furthermore, the power command may be a value calculated by the controller 300 based on measurements or values received from the master controller 400. The power command is preferably the amount of real power 'P' that the power converter 200 is commanded to supply or absorb, to/from the grid. However, it should be understood that the power command is not limited to real power, and the power command may be a real power command P or a reactive power command Q or even an apparent power command.

When the controller 300 is receiving commands from a master controller 400, it is preferable that the commands to controller 300 are real power (P) and reactive power (Q) commands within the rating of the inverter both independently and when added in quadrature to not exceed the apparent power rating of the inverter. The real power command P and reactive power command Q may be commands that are received by the controller 300 from a master controller 400 that is coordinating various energy resources of a micro-grid. In this case, the real power command P and reactive power command Q may be calculated based on various factors, such as the needs of the local loads and the output power of the energy resources of the micro-grid. Alternatively, the real P and reactive Q power commands may be autonomously generated by the controller 200 by, for example, calculating both the real and reactive power needs based on the measurements taken by sensors 150.

If the power command is within the deadband, the controller 300 controls the power converter 200 so that it is not gating, whereby the power system 100 enters into the active-standby mode (step 560—NO). While the power system 100 is in the active-standby mode, the controller 300 continues to compare the power command to the deadband to determine if the power command falls outside the deadband. If the power command is outside the deadband, the controller 300 may control the power converter 200 so that it is gating, whereby the power system 100 enters into active mode (step 570). Once the power system 100 enters into the active mode, the controller 300 continues to monitor the power command to determine whether it falls within the deadband (step 580). If, while in active mode, the power command falls within the deadband, the power system 100 enters into active-standby mode, during which the controller 300 controls the power system 200 so that it is not gating. The power system 100 may also employ hysteresis to prevent rapid switching between the active and active-standby modes.

Figure 6:
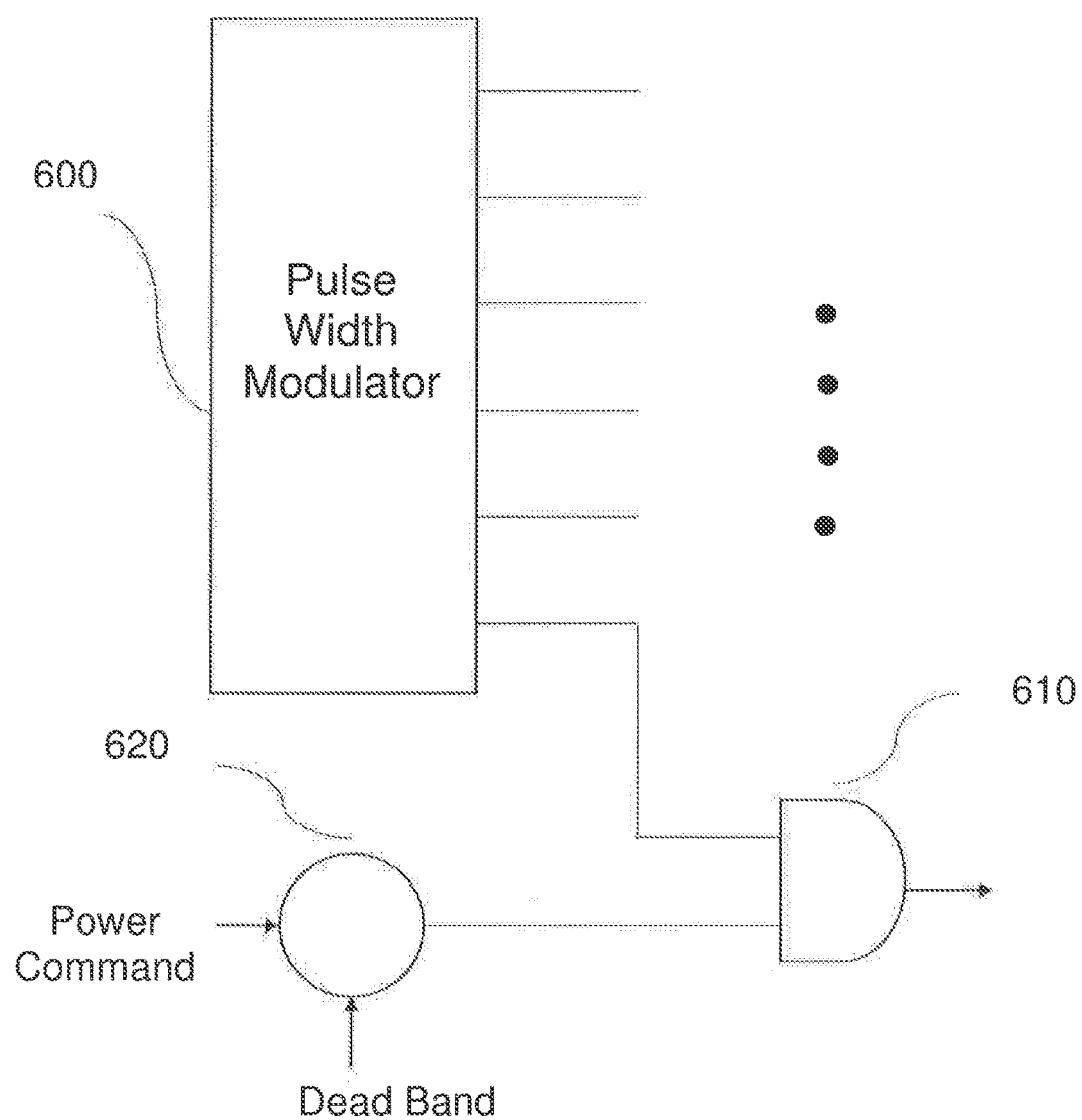
FIG. 6 illustrates a control scheme for comparing the power command to a deadband and entering/leaving a gating state.

FIG. 6 illustrates a control scheme for comparing the power command to a deadband and entering/leaving a gating state. The semiconductor switches 212 may be controlled by pulse width modulated signals output from a pulse width modulator (PWM). As shown in FIG. 6, the result of the comparison 620 between the power command and the deadband is input into one of the inputs of the AND gate. The other input of the AND gate receives one of the outputs of the pulse width modulator 600. When power command falls outside of the deadband, the output of the comparison 620 is a logic high value (or 1), and the output of the AND gate 610 matches the output of the PWM 600. When the power command is within the deadband, the output of the comparison 620 is a logic low (or 0) value, so that the IGBTs 210 do not receive the gating signal output by the PWM 600. The control scheme of FIG. 6 may be a comparison that happens within the firmware of controller 300, or may be part of the control logic implemented by controller 300.

Referring again to FIG. 2B, the method may also include a step of receiving a stop command (step 590), which may be a command from the master controller 400 or a command entered by a user. If a stop command is received (step 190), the power converter 200 stops operation.

The controller 300 controls power system 100 to synchronize the power converter 200 to the grid and to transition the power system 100 between the active mode and the active-standby mode. The controller 200 may be a field-programmable gate array (FPGA) or a digital signal processing (DSP) based controller. However, it should be understood that the controller 200 is not limited to these two types of controllers.

The following control logic illustrates an exemplary embodiment in which controller is performing initialization of the power system 100 when the power system 100 is coupled to a DC power source at input 110.

```
while(grid_ok = 1 and state = ready)
    if (command = start)
        state = starting
    endif
endwhile
while(grid_ok = 1 and state = starting)
    close dc_precharge;
```

```
           wait(precharge_time);
           if(Vdc>Vdc,min)
             close dc_main;
           endif
           start grid_sync;
           start gating;
           close ac_contactor;
           state = runPQ;
           active_stdby = OFF;
         endwhile
```

In the above control logic, 'while(grid_ok=1 and state=ready)' checks whether the grid voltage and frequency are within bounds and the power converter is in a ready state. 'while(grid_ok=1 and state=starting)' is the starting sequence of the power system 100. 'close dc_precharge' closes a relay to gently charge the dc bus from the power source. 'if(Vdc>Vdc,min)' checks that the DC bus is charged. 'close dc_main' closes the dc switch 120. 'start grid_sync' synchronizes the power converter's controls system to the grid. 'start gating' starts switching of the semiconductor devices to emulate the grid voltage. 'close ac_contactor' closes the grid side switch 130. 'state=runPQ' indicates that the control system 100 is running in grid-tied mode. 'active_stdby=OFF' initializes active standby to OFF.

The following control logic illustrates an exemplary embodiment in which controller is comparing a power command to a threshold and operating the power converter 200 in the active and active standby modes. In the exemplary control logic, both real and reactive power commands are compared to an active standby turn off threshold. However, it should be understood that, in alternative embodiments, only one of the real and reactive power commands may be compared to the threshold, or an apparent power command calculated using real and reactive power commands may be compared to a deadband. In addition, in the below control logic, the active-standby turnoff threshold to which the power command is compared includes an upper value and a lower value. The power command is compared to the lower threshold value when determining whether to enter into active standby mode, and the power command is compared to the upper threshold value when determining whether to enter into active mode. Having different upper and lower threshold values prevents rapid switching between the active and active-standby modes.

```
while(state=runPQ and grid_ok=1)
    if(sqrt(Pcmd_usr^2+Qcmd_usr^2) <= InverterRating)
      controlP(Pcmd_usr);
      controlQ(Qcmd_usr);
    else
      controlQ(sqrt(InverterRating^2-Pcmd_user^2))//this
      example P has priority over Q
    endif
    if (Pcmd_usr >= SupkW or Qcmd_usr >= SupkVAR)
      active_stdby = OFF;
    elseif (Pcmd_usr <= SlokW and Qcmd_usr <= SlokVAR)
      active_stdby = ON;
    endif
    if (active_stdby = ON)
      stop gating;
    endif
    if(active_stdby = OFF)
      start gating;
    endif
endwhile
```

In the above control logic, 'while(state=runPQ and grid_ok=1)' refers to the power system 100 running in grid-tied mode. 'sqrt(Pcmd_usr^2+Qcmd_usr^2)' is calculation of the apparent power command using a real power command and a reactive power command (in this exemplary embodiment, the real and reactive power commands are user power commands that may be received by controller 300 from master controller 400). 'if(Pcmd_usr>=SupkW or Qcmd_usr>=SupkVAR)' checks if the real power command is greater than an upper value of the real active standby turn off threshold (if the power command is greater than the threshold, the power command is outside the deadband) or if the reactive power command is greater than an upper value of the reactive active standby turnoff threshold; 'if (Pcmd_usr<=SlokW and Qcmd_usr<=SlokVAR)' checks if the real power command P is less than the a lower value the real active standby turn off threshold and if the reactive power command Q is less than a lower value of the real active standby turn off threshold (if the power command is less than the threshold, the power command is within the deadband); 'if (active_stdby=ON)' turns off semiconductor switch gating; 'if(active_stdby=OFF)' turns on semiconductor switch gating; and 'controlP(Pcmd_usr)' and 'controlQ (Qcmd_usr)' are routines to control the active and reactive power of the power converter 200 to be the power command.

In the above exemplary embodiment, the power command is compared to the deadband or threshold by the controller 300. In another embodiment, it is possible to receive a standby command from a separate master controller 400. Controller 300 receives the standby command from master controller 400 and controls the power converter 200 to be in active-standby mode. This embodiment may be advantageously used in a micro-grid in which master controller 400 is coordinating a variety of distributed energy resources. In such a case, it may be desirable for the master controller to directly instruct the power system 100 to enter into active-standby mode. Exemplary control logic for the controller 200 receiving a standby command directly from master controller 400 includes:

```
while(state=runPQ and grid_ok=1)
    start gating;
    if (command = stdby)
      state = standby
    endif
    controlP(Pcmd_usr);
    controlQ(Qcmd_usr);
endwhile
while(state=standby and grid_ok=1)
    stop gating;
    Pcmd_usr = 0;
    Qcmd_usr = 0;
    if (command = runPQ)
      state = runPQ;
    endif
endwhile
```

In the above control logic, 'start gating' is a start gating sequence to allow restarting of gating when coming back to active mode from a commanded active standby mode. 'if (command=stdby)' changes to active-standby mode when a user commands a standby. 'if (command=runPQ)' changes to active mode when commanded by the user so that the power converter 200 begins gating.

FIG. 3 illustrates a method of controlling the power system 100 according to another embodiment of the present invention in which the power system 100 is connected to an energy storage unit, such as a battery, and implements a plurality of operating modes while the power converter is synchronized to the grid. The initialization method for the control system in this embodiment may be the same as that shown in FIG. 2A and will be omitted for brevity.

FIG. 3 refers to an embodiment in which the power system 100 is coupled to an energy storage unit such as a battery at input 110. When the power system 100 is coupled to an energy storage unit, the power system 100 has both charge and discharge capabilities. In the embodiment shown in FIG. 3, separate thresholds are provided for charge mode and discharge mode. The separate thresholds are the upper and lower bounds of the deadband.

The controller may first determine whether the power converter 200 should be in active mode (power converter 200 is gating) or active-standby mode (step 300, 310 and 312). Steps 300, 310 and 312 may be an initial determination made by the controller 300 as to whether the power system 100 should be in the active mode or the active-standby mode. In an alternative embodiment, the controller 200 may initialize the power system 100 in the active mode, in which case steps 300, 310 and 312 would be a determination as to whether to remain in active mode or enter into active-standby mode.

In determining whether the power converter 200 should be in active mode or active-standby mode, the controller determines whether the power command is positive or negative (step 300). A power command that is positive indicates discharge mode, and a power command that is negative indicates charge mode. When the power command is negative (charge mode) the power command is compared to a first threshold (step 310). When the power command is greater than the first threshold, the controller 300 determines that the power system 100 should enter into the active-standby mode in which the power converter 200 is not gating (step 310—NO), and the controller 300 continues to monitor the power command to determine whether it becomes lower than the first threshold. If the power command is lower than the first threshold, the controller 300 determines that the power system 100 should be in active mode and that gating should continue/begin (step 320).

Once the power system 100 enters into the active mode, the controller 300 continues to monitor the power command to determine whether it is greater than the threshold and the power system 100 should enter into the active-standby mode (step 330—NO). The method may also include a step of receiving a stop command (step 340), which may be a command from the master controller 400 or a command entered by a user. If a stop command is received, the power converter 200 stops operation.

When the power command is positive (discharge mode), the power command is compared to a second threshold (step 312). When the power command is less than the second threshold, the controller 300 determines that the power system 100 should enter into the active-standby mode in which the power converter 200 is not gating (step 312—NO), and the controller 300 continues to monitor the power command to determine whether it becomes greater than the second threshold. If the power command is greater than the second threshold, the controller 300 determines that the power system 100 should be in active mode and that gating should continue/begin (step 322).

Once the power system 100 enters into the active mode, the controller 300 continues to monitor the power command to determine whether it is less than the threshold and the power system 100 should enter into active-standby mode (332—NO). The method may also include a step of receiving a stop command (step 342), which may be a command from the master controller 400 or a command entered by a user. If a stop command is received, the power converter stops operation.

The following control logic illustrates an exemplary embodiment in which the controller is determining whether a power command is a charge command or a discharge command and comparing a power command to one of a first (charge) threshold and a second (discharge) threshold based on the determination. Similar to the above exemplary embodiment, the power system 100 may be initialized in the active mode. In the below exemplary embodiment, each of the first and second thresholds include upper and lower values to prevent rapid switching between active and active-standby modes. In the below exemplary embodiment, the power command is a real power (P) command.

```
while(state=runPQ and grid_ok=1)
    if (Pcmd_usr <= 0)
        if (Pcmd_usr < Pchg_up)
            active_stdby = OFF;
        elseif (Pcmd_usr > Pchg_lo)
            active_stdby = ON;
        endif
    else
        if (Pcmd_usr > Pdis_up)
            active_stdby = OFF;
        elseif (Pcmd_usr < Pdis_lo)
            active_stdby = ON;
        endif
    endif
    if (active_stdby = ON)
        stop gating;
    endif
    if(active_stdby = OFF)
        start gating;
    endif
    controlP(Pcmd_usr);
    controlQ(Qcmd_usr);
endwhile
```

In the above control logic, 'while(state=runPQ and grid_ok=1)' refers to the power system 100 running in grid-tied mode. 'if(Pcmd_usr<=0)' checks if the power command is negative, in which case the power system 100 is in charge mode. 'if (Pcmd_usr<Pchg_up)' checks, when in charge mode, if the power/charge command is less than an upper value of a first (charge) threshold (this means that more charge is commanded since the charge convention is negative power). 'elseif (Pcmd_usr>Pchg_lo)' checks, when in charge mode, if the charge command is higher than a lower value of the first threshold (this means that the power/charge command is low and within the deadband). 'else' refers to when the power command is positive, in which case the system is in discharge mode. if (Pcmd_usr>Pdis_up) checks, when in discharge mode, if the power/discharge command is greater than an upper value of the of the second threshold. elseif (Pcmd_usr<Pdis_lo) checks, when in discharge mode, if the power/discharge command is less than a lower value of the second threshold.

In the above-described control logic, the controller compares active and/or reactive power commands to a threshold. These commands may be received by a master controller 400, or autonomously generated by the controller 300 itself. The following control logic illustrates an exemplary embodiment in which the active power command is set by controller 300 as a function of grid frequency (e.g., using a Hz-Watt function). The reactive power command may be set by controller 300 based on a Volt-Var type function. In the below exemplary control logic, the grid frequency is compared to a frequency threshold to determine whether to enter into active mode or active standby mode. The frequency threshold includes an upper value and a lower value, which form the upper and lower bounds of the deadband.

```
while(state=runPQ and grid_ok=1)
   grid_connect
   if (GridFrequency <= minGridF or GridFrequency >=maxGridF)
      controlP(FComp(GridFrequency));
      active_stdby = OFF;
   elseif (GridFrequency > minGridF AND GridFrequency< maxGridF)
      active_stdby = ON;
   endif
   if (active_stdby = ON)
   stop gating;
   endif
   if(active_stdby = OFF)
   start gating;
   endif
endWhile
```

For the above control logic, if (GridFrequency<= minGridF or GridFrequency>=maxGridF) refers to the situation where the grid frequency falls outside of lower and upper values of the threshold/deadband, in which case active standby is off. controlP(FComp(GridFrequency)) is a control function that sets the power command as a function of grid frequency. Fcomp is a function that returns a power command based upon grid frequency (e.g., a Hz-Watt function). Fcomp can be any known function that returns such a power command, and can be a closed loop or open loop function. For example, Fcomp may be a function in which the inverter responds with a predetermined power (e.g., 100% or -100% power) when the grid level is above or below a certain frequency. Fcomp may be an option that can be enabled by the power system or a user of the power system. For example, the power converter 200 may operate in a normal grid tied mode unless Fcomp is enabled. elseif (GridFrequency>minGridF AND GridFrequency<maxGridF) refers to the situation where the grid frequency falls within the deadband, in which case the inverter is set to output 0 kW and active standby is turned on. Example settings for the deadband range of FComp could be minGridF=59.7 Hz and maxGridF=60.5 Hz.

In the aforesaid exemplary control logic, the deadband/threshold is a frequency deadband/threshold. In other words, the grid frequency is compared to upper and lower limits of a deadband/threshold to determine whether to enter into active standby mode. In another embodiment, this operation could be active simultaneously with any of the above control logic in which the power command is compared to a power deadband. For example, the autonomously generated power command set using controlP(FComp(GridFrequency)) could be compared to a power threshold/deadband at the same time the grid frequency is compared to the frequency threshold/deadband.

In the above-described control logic, the controller 300 controls the power converter 200 to be in active or active-standby mode while the power converter 200 is synchronized to the grid. In micro-grid applications, the power system 100 may be connected to the micro-grid and the utility grid at the grid connection 160. The utility grid may undergo a grid event, such as a power outage, where the power system 100 needs to disconnect from the grid and transition to a stand-alone (or islanded) mode during which the power source of the power system 100 is needed to power the local loads of the micro-grid.

Referring to FIG. 4 the controller may first determine that grid event occurs (step 400). The controller may determine that a grid even occurs by detecting a grid event using measurements taken by sensors 150. The grid event may, for example, be a power outage. The grid event may also be based on whether the grid voltage or frequency—which may be measured by sensors 150—falls outside of predetermined bounds. In an alternative embodiment, the grid event may be detected by a master controller 400 that is coordinating the operations of the micro-grid. The master controller 400 may then send a control signal to controller 300 indicating that a grid event has occurred. Upon receipt of the control signal, controller 300 determines that a grid event has occurred.

Once controller 300 has determined that a grid event occurs, controller 300 sends a control signal to an islanding switch so that the islanding switch opens and disconnects the power system 100 from the grid (step 410). The islanding switch is a separate switch from the grid side switch 130. The grid side switch 130 disconnects the power converter 200 from the grid connection 160, which includes both the connection to the micro-grid and the utility grid. Differently, the islanding switch disconnects the power system 100 from the utility grid but not the micro-grid. In an alternative embodiment, master controller 400 may send the control signal to the islanding switch rather than controller 300.

Once the power system 100 is disconnected from the utility grid, the power system 100 is needed to power the local loads of the micro-grid. Thus, if the power system 100 is in the active standby mode, the controller 300 controls the power converter to begin gating (step 430) so that power can be supplied to the local loads. Once controller 300 determines that the grid is available (step 430), the power system 100 can reconnect to the grid (step 440). Once the power converter is reconnected and synchronized to the grid, the controller 300 may again begin determining whether the power system 100 should be in the active mode or the active-standby mode, by, for example, reverting back to FIG. 2B or 3 (step a).

Exemplary control logic for the controller 300 operating the power converter 200 in the active and active standby modes in a power system 100 capable of operating in an islanding mode includes:

```
while(state=runPQ and grid_ok=1)
   grid_connect
   controlP(Pcmd_usr);
   controlQ(Qcmd_usr);
   if (Pcmd_usr >= SupkW or Qcmd_usr >= SupkVAR)
   active_stdby = OFF;
   elseif (Pcmd_usr <= SlokW and Qcmd_usr <= SlokVAR)
   active_stdby = ON;
   endif
   if (active_stdby = ON)
   stop gating;
   endif
   if(active_stdby = OFF)
   start gating;
   endif
endWhile
```

The exemplary control logic adds 'grid_connect' to the power controller's control system. For 'grid_connect', the controller 300 closes the islanding switch that connects the power system 100 to the utility grid. For disconnecting the power system 100 during a grid event, the control logic may include:

```
if (grid_ok=0 and auto_xfr=1)
   state = runUF;
endif
```

```
        endwhile
        while(state=runUF)
          grid_disconnect;
          start gating;
          controlU(Ucmd_usr);
          controlF(fcmd_usr);
          if (grid_ok = 1 and reconnect_time=0
            state = runPQ;
          endif
        endwhile
```

For the above control logic, 'if (grid_ok=0 and auto_xfr=1)' is a determination as to whether there is a grid event (such as an outage) and automatic transfer is turned on (meaning that the system will automatically transition from grid tied to microgrid mode without user intervention). 'grid_disconnect' opens the islanding switch to disconnect the power system 100 from the main utility grid. 'start gating' resumes gating if not already on (in other words, if the system is in active-standby, it exits active-standby and enters active mode). 'controlU(Ucmd_usr)' is a routine to control power converter output voltage to a voltage command. 'controlF(fcmd_usr)' is a routine to control output frequency to a frequency command. For 'if (grid_ok=1 and reconnect_time=0)', if the grid becomes available and a reconnect countdown has passed, the power system reverts back to grid-tie mode.

The voltage command and frequency command are commands for the output voltage and frequency of the power converter 200. In the above control logic, these commands are user commands received by controller 300 from master controller 400. The voltage command and frequency command may also be autonomously generated by the controller 300. The voltage command and frequency command are for providing power to the microgrid. The user may wish to modify the output voltage and/or the frequency of the power converter 200 during voltage source mode. The user may wish to make such a change if there is a voltage drop in the local transmission such that the voltage at the load is less than the desired voltage.

The disclosed embodiments provide an power system and method in which an power converter 200 can be operated in a plurality of modes when synchronized to a grid. The plurality of modes include an active-standby mode during which the power system's switches 120 and 130 are closed and the power converter 200 is synchronized to the grid, but the semiconductor switches of the power converter 200 are not gating. The power system's 100 controller 200 controls transition between the active-standby mode and active mode in an efficient manner by utilizing a deadband/threshold and comparing a power command to the deadband/threshold. Consistent with the disclosed embodiments of the present disclosure, the disclosed power system advantageously has a fast response time when transitioning from and idle state to a fully charging or discharging state. Consistent with the disclosed embodiments of the present disclosure, the disclosed power system 100 provides a fast response time without incurring the losses typical of having a power converter 200 synchronized to the grid while outputting no power. The disclosed embodiments provide a power system with a fast response time that conserves energy.

Although a battery is given as an exemplary power source connected to input in the aforesaid embodiments discussed in connection with FIGS. 2-4 and the aforesaid control logic, it should be understood the present invention is not limited to the use of a battery as a power source. For example, embodiments of the present invention are suitable for any power source from which power is not constantly demanded or produced, such as a wind turbine or photovoltaic/solar panels.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A power system for coupling between at least one power source and a grid and having a plurality of operating modes including at least an active mode and an active standby mode both in which the power system is electrically coupled to the grid and a disconnected mode in which the power system is electrically disconnected from the grid, the power system comprising:
   a power converter configured to adapt a power supply to a desired output, the power converter comprising a plurality of semiconductor switches, the plurality of semiconductor switches receiving a gate signal when the power system is in the active mode such that the power converter is in a gating state;
   a controller for controlling the power converter in the active mode and the active standby mode, the active mode being a mode in which the power converter is electrically coupled to the at least one power source and the grid, is synchronized with the grid, and supplies or absorbs power to/from the grid, and the active standby mode being a mode in which the power converter is electrically coupled to the at least one power source and the grid, the controller is synchronized with the grid and the controller controls the power converter to be in a non-gating state in which the controller prevents the semiconductor switches from receiving the gate signal, the controller being configured to:
      determine whether the power system should enter into the active standby mode in which the power converter is in a non-gating state according to a power command, wherein the power command is a value representing the magnitude of power that the power converter is commanded to supply or absorb,
      when it is determined the power system should enter into the active standby mode, control the power converter to be in the non-gating state such that the power system is in the active standby mode.

2. The power system of claim 1, wherein the power converter is a power inverter coupled between the at least one power source and the grid.

3. The power system of claim 1, wherein further comprising:
   a power source side switch coupled between the at least one power source and the power converter and a grid side switch coupled between the at least one power source and a grid,
   wherein the power source side switch and the grid side switch are closed in both the active mode and the active standby mode such that the power converter is electrically coupled to the power source and the grid, and
   wherein the grid side switch is opened in the disconnect mode such that the power converter is electrically disconnected from the grid.

4. The power system of claim 3, wherein the power converter is a power inverter coupled between the at least one power source and the grid, and the controller is further configured to initialize the power inverter, the controller being configured to initialize the power inverter includes the controller being configured to:
charge a DC bus from the at least one power source;
close the power source side switch;
synchronize the power inverter to the grid;
enter the power inverter into the gating state;
close the grid side switch coupled between the power inverter and the grid whereby the power system is in a grid-tied mode; and
initialize active standby mode to off.

5. The power system of claim 1, wherein the at least one power source includes an energy storage unit, and the power system operates in a discharge state in which the controller controls the power converter to discharge the energy storage unit, a charge state in which the controller controls the power converter to charge the energy storage unit, and an idle state, and
the controller determines the power system should enter into the active standby mode when the power system is in an idle state.

6. The power system of claim 5, wherein the controller being configured to determine whether the power system should enter into the active standby mode includes the controller being configured to:
determine whether the power system is in the charge state or the discharge state by determining whether the power command is positive or negative;
when it is determined that the power system is in the charge state, compare the power command to a first predetermined threshold, and when it is determined that the power command is higher than the first predetermined threshold, determine that the power system is in the idle state and should enter into the active standby mode;
when it is determined that the power system is in the discharge state, compare the power command to a second predetermined threshold, and when it is determined that the power command is lower than the second predetermined threshold, determine that the power system is in the idle state and should enter into the active standby mode.

7. The power system of claim 6, wherein the first predetermined threshold includes an upper first threshold value and a lower first threshold value, and the second predetermined threshold includes an upper second threshold value and a lower second threshold value, and
when it is determined that the power system is in the charge state, the power command is compared to the lower first threshold value to determine whether to enter the active standby mode, and the power command is compared to the upper first threshold value to determine whether to enter into the active mode, and
when it is determined that the power system is in the discharge state, the power command is compared to the lower second threshold value to determine whether to enter into the active standby mode, and the power command is compared to the upper second threshold value to determine whether to enter into the active mode.

8. The power system of claim 1, wherein the controller being configured to determine whether the power system should enter into the active standby mode includes the controller being configured to:
compare the power command to a predetermined threshold;
determine whether the power system should enter into the active standby mode according to the comparison.

9. The power system of claim 8, wherein the predetermined threshold includes an upper threshold value and a lower threshold value, and the controller compares the power command to the lower threshold value when determining whether to enter into active standby mode, and the power command is compared to the upper threshold value when determining whether to enter into active mode.

10. The power system of claim 8, wherein the controller is configured to determine the power system should enter into the active standby mode when the power command is less than a predetermined threshold, and the control system is further configured to:
after entering into the active standby mode, determine whether the power system should exit the active standby mode and enter the active mode by continuing to compare the power command to the predetermined threshold, and if the power command is greater than the predetermined threshold, control the power converter to be in the gating state.

11. The power system of claim 1, further comprising:
one or more sensors coupled between the power converter and the grid to measure real and reactive power;
wherein the power command is determined based on real and reactive power measured by the one or more sensors.

12. The power system of claim 1, wherein the controller comprises a separate master controller and a power converter controller, and the power converter controller is configured to receive a user command from the master controller to enter into the active standby mode, and determine that the power system should enter into the active standby mode when the user command is received.

13. The power system of claim 1, wherein the controller is configured to perform an AND operation on the gate signal and a result based on determining whether the power system should enter into the active standby mode such that the semiconductor switches receive the gate signal when it is determined that the power system should be in the active mode and the semiconductor switches do not receive the gate signal when it is determined that the power system should be in the active standby mode.

14. The power system of claim 1, wherein the power converter is coupled between the at least one power source and a utility grid, and the power converter is electrically coupled to a microgrid having one or more local loads, and the controller is further configured to:
determine when a grid event occurs in the utility grid;
open an islanding switch to disconnect the power converter from the utility grid when it is determined that the grid event occurs; and
if the power system is in the active standby mode and it is determined that the grid event occurs, enter into the active mode such that the power converter is gating to supply power to the one or more local loads.

15. The power system of claim 1, wherein the controller being configured to determine whether the power system should enter into the active standby mode includes the controller being configured to:
compare a grid frequency to a predetermined threshold; and
determine whether the power system should enter into the active standby mode according to the comparison.

16. A method for controlling a power system, comprising a power converter controlled by a controller, that operates in a plurality of operating modes including at least an active mode and an active standby mode both in which the power system is electrically coupled to a grid and a disconnected mode in which the power system is electrically disconnected from the grid, the method comprising:

comparing a power command to a predetermined threshold and determining whether the power system should be in the active standby mode or the active mode based on the comparison, the power command being a value representing the magnitude of power that the power converter is commanded to supply or absorb, wherein the active mode is a mode in which the power converter is electrically coupled to at least one power source and the grid, is synchronized with the grid, and supplies or absorbs power to/from the grid, and the active standby mode is a mode in which the power converter is electrically coupled to the at least one power source and the grid, the controller is synchronized with the grid and the controller controls the power converter to be in a non-gating state in which the controller prevents semiconductor switches of the power converter from receiving a gate signal;

when it is determined that the power system should enter into the active standby mode, controlling the power converter to be in the non-gating state such that the power system is in the active standby mode.

17. The method of claim 16, wherein prior to comparing the power command to the predetermined threshold, the method further comprises initializing the power converter, the initializing comprising:

synchronizing the power converter to the grid;
entering the power converter into the gating state;
closing a switch coupled between the power converter and the grid such that the power system is in a grid-tied mode; and
initializing active standby mode to off.

18. The method of claim 16, further comprising:
after determining the power system should enter into the active standby mode, continuing to compare the power command to the predetermined threshold to determine whether the power system should exit the active standby mode and enter into the active mode.

19. The method of claim 16, wherein:
the at least one power source includes an energy storage unit, and the power system operates in a discharge state in which the controller controls the power converter to discharge the energy storage unit, a charge state in which the controller controls the power converter to charge the energy storage unit, and an idle state, and
comparing a power command to a predetermined threshold and determining whether the power system should enter into the active standby mode based on the comparison comprises:
determining whether the power system is in the charge state or the discharge state by determining whether the power command is positive or negative;
when it is determined that the power system is in the charge state, comparing the power command to a first predetermined threshold, and when it is determined that the power command is higher than the first predetermined threshold, determining that the power system should enter into the active standby mode;
when it is determined that the power system is in the discharge state, comparing the power command to a second predetermined threshold, and when it is determined that the power command is lower than the second predetermined threshold, determining that the power system should enter into the active standby mode.

20. The method of claim 16, further comprising receiving the power command from a separate master controller.

21. The method of claim 16, further comprising:
determining when a grid event occurs;
opening an islanding switch to disconnect the power inverter from the grid when it is determined that the grid event occurs; and
if the power system is in the active standby mode and it is determined that the grid event occurs, entering into the active mode such that the power converter is gating to supply power to a local load.

22. A power inverter system for coupling between at least one power source and a grid and operating in a plurality of modes including at least an active mode and an active standby mode both in which the power system is electrically coupled to the grid and a disconnected mode in which the power system is electrically disconnected from the grid, the power inverter system comprising:

a power inverter for power conversion between a power source and a grid, the power inverter comprising a plurality of semiconductor switches, the plurality of semiconductor switches receiving a gate signal when operating in the active mode such that the power inverter is in a gating state;

a controller for controlling the power inverter in the active mode and the active standby mode, the active mode being a mode in which the power inverter is electrically coupled to the at least one power source and the grid, is synchronized with the grid, and supplies or absorbs power to/from the grid, and the active standby mode being a mode in which the power inverter is electrically coupled to the at least one power source and the grid, the power controller is synchronized with the grid and the controller controls the power inverter to be in a non-gating state in which the controller prevents the semiconductor switches from receiving the gate signal, the controller being configured to:

synchronize the power inverter to the grid;
control the power inverter to be in the gating state in the active mode such that the semiconductor switches receive the gate signal;
determine whether the power inverter should enter into the active standby mode in which the power inverter is in Ran the non-gating state according to a power command, wherein the power command is a value representing the magnitude of power that the power inverter is commanded to supply or absorb;
when in the active standby mode, control the power inverter to be in the non-gating state such that the power system is in the active standby mode.

23. The power inverter system of claim 22, wherein the controller being configured to determine whether the power inverter should enter into the active standby mode includes the controller being configured to:
compare the power command to a predetermined threshold;
determine whether the power inverter should enter into the active standby mode according to the comparison.

24. The power inverter system of claim 23, wherein the controller is further configured to:
while the power inverter is in the active standby mode, compare the power command to the predetermined threshold to determine whether the power inverter should exit the active standby mode and enter into the active mode.

25. The power inverter system of claim 22, wherein the controller being configured to determine whether the power inverter should enter into the active standby mode includes the controller being configured to:
   determine whether the power command is positive or negative;
   when the power command is negative, compare the power command to a first predetermined threshold, and when it is determined that the power command is higher than the first predetermined threshold, determine that the power inverter should enter into the active standby mode;
   when the power command is positive, compare the power command to a second predetermined threshold, and when it is determined that the power command is lower than the second predetermined threshold, determine that the power inverter should enter into the active standby mode.

26. The power inverter system of claim 22, wherein the controller comprises a separate master controller and a power converter controller, and the power converter controller is further configured to receive a user command from the master controller to enter into the active standby mode, and determine that the power inverter should enter into the active standby mode when the user command is received.

27. The power inverter system of claim 22, wherein the controller is configured to perform an AND operation on the gate signal and a result based on determining whether the power inverter should enter into the active standby mode such that the semiconductor switches receive the gate signal when it is determined that the power system should be in the active mode and the semiconductor switches do not receive the gate signal when it is determined that the power system should be in the active standby mode.

28. The power inverter system of claim 22, wherein the controller is further configured to:
   determine when a grid event occurs; and
   if the power inverter is in the active standby mode and it is determined that the grid event occurs, enter into the active mode such that the power inverter is gating to supply power to a local load.

29. The power inverter system of claim 22, wherein the controller being configured to determine whether the power inverter system should enter into the active standby mode includes the controller being configured to:
   compare a grid frequency to a predetermined threshold; and
   determine whether the power inverter system should enter into the active standby mode according to the comparison.

* * * * *